United States Patent

Pattantyus

[15] 3,689,691

[45] Sept. 5, 1972

[54] CHANNEL EQUALIZATION FOR DIFFERENCING PRE-RECORDED AND LIVE VIDEO SIGNALS

[72] Inventor: Tamas I. Pattantyus, Pittsburgh, Pa.

[73] Assignee: Westinghouse Electric Corporation, Pittsburgh, Pa.

[22] Filed: Nov. 17, 1970

[21] Appl. No.: 90,260

[52] U.S. Cl........178/6.8, 178/DIG. 33, 178/DIG. 37, 325/65

[51] Int. Cl.............................H04n 5/76, H04n 7/18

[58] Field of Search...178/DIG. 5, DIG. 33, DIG. 37, 178/DIG. 1, 6.8, 1, 33, 37; 325/65, 311; 328/162, 163

[56] References Cited

UNITED STATES PATENTS

| | | | |
|---|---|---|---|
| 3,049,588 | 8/1962 | Barnett | 178/DIG. 1 |
| 3,507,992 | 4/1970 | Foote | 178/DIG. 33 |
| 3,546,377 | 12/1970 | Troll | 178/DIG. 33 |
| 2,202,605 | 5/1940 | Schroter | 178/DIG. 33 |
| 2,597,636 | 5/1952 | Hall et al. | 178/DIG. 33 |

*Primary Examiner*—Robert L. Griffin
*Assistant Examiner*—Richard K. Eckert, Jr.
*Attorney*—F. H. Henson and C. F. Renz

[57] ABSTRACT

A system of channel equalization for differencing recorded and live signals, such as produced in response to input video signals, wherein the input video signals are processed commonly then applied to separate record and live channels having essentially identical characteristics. The difference between the recorded and live signals, having substantially identical processing, is then taken and displayed on a monitor.

8 Claims, 1 Drawing Figure

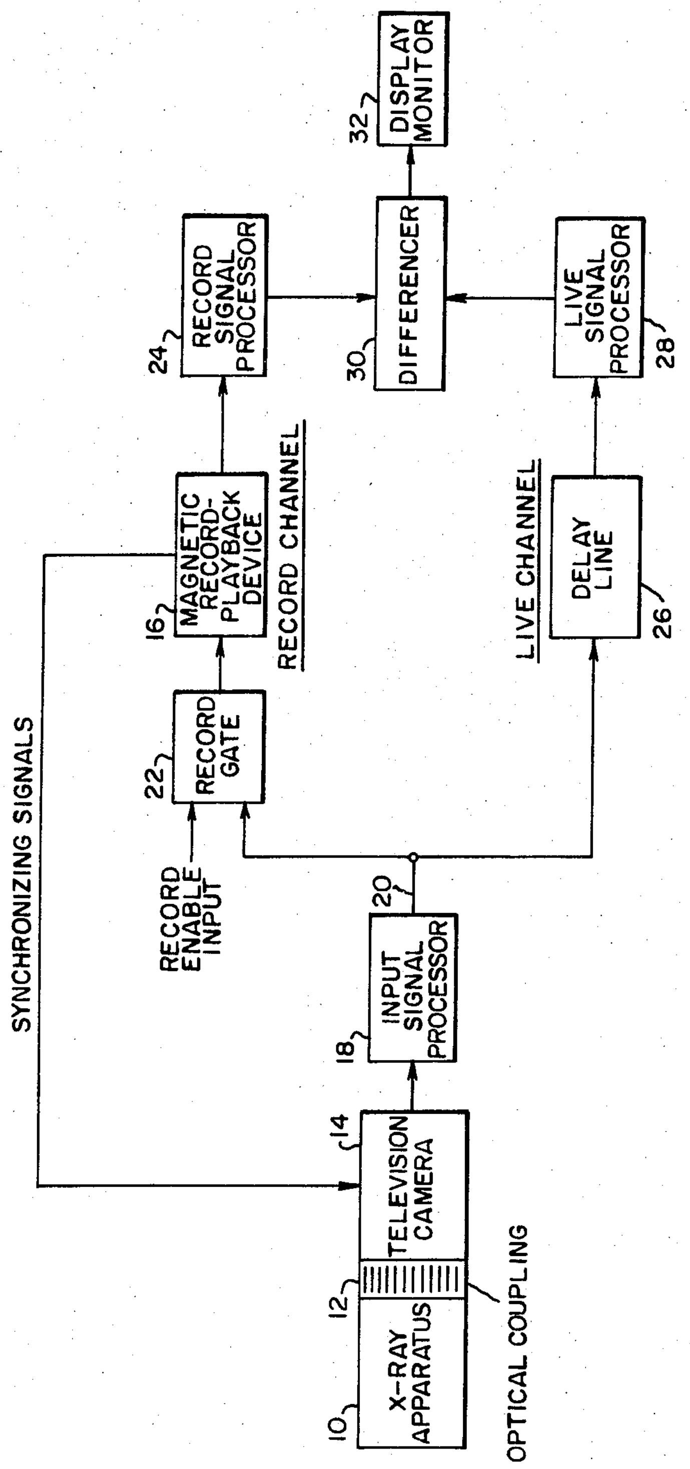
WITNESSES:
Bernard R. Gieguez
[signature]
INVENTOR
Tamas I. Pattantyus
BY
[signature]
ATTORNEY

CHANNEL EQUALIZATION FOR DIFFERENCING PRE-RECORDED AND LIVE VIDEO SIGNALS

BACKGROUND OF THE INVENTION

1. Field of the Invention

The present invention relates to channel equalization techniques and, more particularly, to channel equalization for differencing recorded and live signals.

2. Discussion of the Prior Art

In copending application Ser. No. 754,546 (W.E. 39,255) filed Aug. 22, 1968 now U.S. Pat. No. 3,582,651 by M. P. Seidband and assigned to the same assignee as the present application, an X-ray differencing system is taught wherein video signals produced in response to scanning an X-ray image are recorded in a magnetic recording media such as a magnetic recording disc. By subtracting the recorded video signals from video signals produced in real time by scanning an X-ray image, the difference between the recorded video signals and the live video signals is provided. The difference is then displayed on a television monitor, for example, with the difference being indicative of the change in the X-ray image from the time of the recorded image to the real time image. Thus, if video signals were recorded corresponding to an X-ray image provided prior to the insertion of the dye, for example, into an area of a patient under surveillance and video signals corresponding to an X-ray image taken after the dye had been inserted into the patient were subtracted from one another, the net difference therebetween would enhance the dispersion of the dye with the common portions of the X-ray images being cancelled. Synchronization between the recorded and live signals is accomplished by providing a pre-recorded synchronizing track on the recording media which is utilized to control the recording process and also the production of the input video generated in response and also the production of the input video signals generated in response to scanning the X-ray image.

In the recording channel of such a differencing system, it is necessary that the input video signals to be recorded be processed prior to being recorded and then recorded on the recording media by frequency modulation or other techniques. Upon playback the recorded signals are further processed to provide a suitable video output for comparison with the live channel output. It is further necessary that the live video signals be delayed by a time substantially equal to the time delay resulting in the signal processing prior to recording, in the recording process and also in the after recording signal processing. Moreover, in the live channel it is necessary that the live video signals be processed to have characteristics substantially similar to the characteristics of the output video from the recording channel. This is necessary in order that a meaningful difference be provided between the recorded output video and the live output video. Difficulties arise in matching the parameters of the two channels due to differences in the bandwidth, non-linearities and delays associated therewith. The live channel may be matched with the recording channel through the use of filters and non-linear amplification; however, this requires a tedious and lengthy adjustment for effective channel equalization which would be highly desirable to avoid.

SUMMARY OF THE INVENTION

Broadly the present invention provides a channel equalization system for differencing recorded and live signals wherein input signals are commonly processed with a portion thereof being recorded and processed and upon playback to be compared with live signals which are similarly processed to provide a difference output indicative of the difference between the record and live signals.

BRIEF DESCRIPTION OF THE DRAWING

The single FIGURE is a block diagram of the channel equalization system of the present invention.

DESCRIPTION OF THE PREFERRED EMBODIMENT

Referring to the figure, X-ray apparatus 10 provides by well known techniques an X-ray image indicative of a portion of a patient under examination, for example, the X-ray image is optically coupled via an optical coupling 12 to the input of a television camera 14. The television camera 14 scans the X-ray image to provide input video signals corresponding to the scanned X-ray image. The scanning operation of television camera 14 is controlled by synchronizing signals provided thereto from a magnetic record-playback device 16. The magnetic record-playback device 16 may comprise a magnetic disc recorder wherein a synchronizing track is provided thereon such as taught in the above cited copending application. The output of the television camera 14 thus comprises input video signals at a preselected horizontal and vertical scanning rate.

The video signal output of the camera 14 is applied to an input signal processor 18. The input signal processor 18 may comprise a frequency modulator, for example, for processing the video signal input thereto to a suitable format for recording in the magnetic record-playback device 16. However, it should be understood that other processors, such as, phase, or amplitude modulators or pulse frequency, pulse width or pulse amplitude modulators may also be employed. Regardless of the form that the input signal processor 18 takes there will be some bandwidth and linearity distortion of the input video signal as it passes therethrough and also some time delay will occur between its input and output signals. The processed signals from the output 20 of the input signal processor 18 are applied to a record channel and a live channel. The record channel includes a record gate 22, the magnetic record and playback device 16 and a record signal processor 24. The live channel includes a delay line 26 and a live signal processor 28.

The record gate 22 is normally closed to block the passage of the processed signal output 20 from being applied through the record gate 22 to the magnetic device 16. In order to record information corresponding to a selected X-ray image, a record enable input is applied to the record gate 22 thereby opening this gate so that the processed signal output 20 is applied through the record gate 22 to the magnetic record playback device 16 and accordingly recorded therein. The signals are recorded, for example, on a track of a magnetic recording disc such as taught in the above cited copending application. The record input is applied to the record gate 22 only for a time period corresponding to a complete frame of video signals, that is, a time period corresponding to a two fields to be interlaced as is standard television practice. With the processed signal output 20 corresponding to a frame of video information (indicative of the X-ray image to be recorded) being recorded in the magnetic device 16, this recorded information will be continuously available for playback as desired. The record input is removed from the record gate 22 after the frame of video information is recorded in the magnetic device 16.

The processed signal output 20 of the input signal processor 18 is also applied to the delay line 26 of the live channel. The delay time of the delay line 26 is designated to compensate for any time delays in the recording and playback operation of the magnetic record-playback device 16. Since the input to both the record channel and live channel come from the common source 20, the time delay required for the delay line 26 is minimized as opposed to the case when only signals to be recorded are processed. The delayed output of the delay line 26 is applied to a live signal processor 28. The function of the live signal processor 28 is to demodulate the input thereto to provide an output corresponding to the video signal input to the input signal processor 18, that is, to a video signal form suitable for display on a television monitor. Thus, if the input signal processor 18 is an FM modulator, the live signal processor 28 would comprise an FM demodulator. In other words the live signal processor 28 would be the appropriate type of demodulator for the modulation technique of the input signal processor 18.

The output of the live signal processor 28 will thus be live signals in video signal form having a real time relationship with the X-ray image presently being scanned by the television camera 14. The live signal output of the live signal processor 28 is applied to a differencer 30.

In order to compare the live signal output of the live signal processor 28 of the live channel with the information recorded in the magnetic record-playback device 16 corresponding to the selected X-ray image to be recorded, the recorded information is played back from the magnetic record-playback device 16 by well known techniques and applied to the record signal processor 24. The function of the record signal processor 24 is to demodulate the processed signals that had been recorded in the magnetic device 16 to a video form corresponding to video signal input to the input signal processor 18. The record signal processor 24 is designed to have substantially identical characteristics to that of the live signal processor 28. That is the record signal processor 24 will respond substantially identically to the input thereto as would the live signal processor 28. Accordingly the output of the record signal processor 24 will comprise a recorded signal output in the form of video signals corresponding to the X-ray image frame that had been recorded in the magnetic device 16. The output of the record signal processor 24 is applied at the other input to the differencer 30.

The function of the differencer 30 is to take the difference between the live signal input thereto and the recorded signal input thereto and to provide the difference therebetween as a different output in the form of video signals. The difference video output is supplied to a display monitor 32 which may comprise a standard television monitor which will display the difference video image corresponding to the difference between the originally recorded X-ray image and the real time video image appearing at that instant in time.

The recorded and live signals applied to the differencer 30 have been subjected to substantially identical processing; thus the characteristics of these signals are such to permit an ideal comparison therebetween so that the common portions thereof will be cancelled and the difference will accordingly be enhanced for display on the display monitor 32.

The described channel equalization system has a number of important advantages over the prior art technique of utilizing filters and non-linear amplifiers in the live channel. One advantage is that there is no additional degradation in picture quality in the described system as compared to a filter non-linear amplifier technique since it is the difference between the outputs of the live and record channel which receive substantially identical processing, that is to be displayed. Moreover, because the input signal processor is shared by both the record and live channel the attendant bandwidth distortion and delays thereof will be common to both channels and therefore will not affect the differencing operation. This eliminates the need for the careful and tedious alignment of the live channel to provide similar characteristics to the record channel. Additionally through the use of the record signal processor 24 and the live signal processor 28 having substantially equivalent characteristics common bandwidth limitations, distortions and delays are introduced in both the live and record channels so that these characteristics are compensated for. Lastly, the time delay required of the delay line 26 is reduced in comparison to the technique in comparison to the technique where the live signals are not applied to the input signal processor 18. Since the majority of the delay time would occur in the input processor 18 and the matched record signal processor 24 and the live signal processor 28, the only delay time that must be compensated for is that of the magnetic record-playback device 16 which is relatively small. Due to the fact that any reduction in the delay time reduces the bandwidth limiting due to the delay line, then the equalization between the two channels is more accurate and provides for a more accurate comparison of the live and recorded signals in the differencer 30.

I claim as my invention:

1. In a system for channel equalization of recorded and live output signals produced in response to live input signals the combination of: input modulator means for modulating said live input signals to provide processed input signals; recording means for recording a selected predetermined quantity of said processed input signals; first demodulator means for demodulating said processed input signals to provide said live output signals; and second demodulator means for demodulating said selected predetermined quantity of said processed input signals recorded in said recording means to provide said recorded output signals; said first and second demodulator means having substantially equivalent response characteristics to signals applied thereto; said first and second demodulator means producing said live and recorded output signals respectively 2. The combination of claim 1 includes:

delay means for delaying said processed input signals by a predetermined time before application to said first demodulator means so that said live and recorded output signals have a substantially equivalent time relationship.

3. The combination of claim 1 wherein:

said line input signals comprise video signals, said recorded output signals are indicative of a selected image from storage;

said live output signals are indicative of a real time image,

4. The combination of claim 3 wherein:

said recording means includes magnetic recording and playback means wherein said selected signals are recorded therein and may be played back as said recorded output signals indicative of said selected image.

5. The combination of claim 1 wherein:

said recording means includes magnetic recording and playback means wherein said selected signals are recorded therein and may be played back as said recorded signals.

6. The combination of claim 5 wherein:

said magnetic recording and playback means has a predetermined time delay required for the recording and playing back operation;

said combination includes delay means for delaying said processed input signals by said predetermined time delay before application to said first demodulator means so that said live and recorded output signals have a substantially equivalent time relationship.

7. The combination of claim 1 includes:

differencing means for providing the difference between said live and recorded output signals; and monitor means for providing an indication of said difference between said live and recorded output signals.

8. The combination of claim 7 wherein;

said difference image is displayed on said monitor means.

* * * * *